(12) United States Patent
Yang et al.

(10) Patent No.: US 10,751,990 B2
(45) Date of Patent: Aug. 25, 2020

(54) APPARATUS FOR DETECTING LIQUID DISCHARGE CHARACTERISTICS AND APPARATUS FOR DISCHARGING LIQUID

(71) Applicant: SEMES CO., LTD., Cheonan-si, Chungcheongnam-do (KR)

(72) Inventors: Keun Hwa Yang, Hwaseong-si (KR);
Soon Yong Jeong, Hwaseong-si (KR);
Jung Wan Hong, Hwaseong-si (KR);
Gon Kim, Seoul (KR)

(73) Assignee: SEMES CO., LTD., Cheonan-si, Chungcheongnam-do (KR)

( * ) Notice: Subject to any disclaimer, the term of this patent is extended or adjusted under 35 U.S.C. 154(b) by 0 days.

(21) Appl. No.: 16/503,427

(22) Filed: Jul. 3, 2019

(65) Prior Publication Data

US 2020/0009861 A1  Jan. 9, 2020

(30) Foreign Application Priority Data

Jul. 4, 2018  (KR) .................. 10-2018-0077816

(51) Int. Cl.
*B41J 2/045* (2006.01)
*G01N 21/31* (2006.01)
*B41J 2/14* (2006.01)

(52) U.S. Cl.
CPC ......... *B41J 2/0456* (2013.01); *B41J 2/04563* (2013.01); *B41J 2/04586* (2013.01); *B41J 2/1433* (2013.01); *G01N 21/3151* (2013.01); *B41J 2002/14354* (2013.01)

(58) Field of Classification Search
CPC .. B41J 2/0456; B41J 2/04586; B41J 2/04563; B41J 2/1433; B41J 2/16579; B41J 2/2142; B41J 2/01; B41J 2002/14354; G01N 21/3151

See application file for complete search history.

(56) References Cited

U.S. PATENT DOCUMENTS

2005/0212875 A1* 9/2005 Kodama .................. B41J 2/19
347/84

FOREIGN PATENT DOCUMENTS

| JP | 10264411 A | * 10/1998 |
| KR | 10-2009-0083281 | 8/2009 |
| KR | 10-2016-0127949 | 11/2016 |

* cited by examiner

*Primary Examiner* — Sharon A. Polk

(57) ABSTRACT

Disclosed is an apparatus for detecting liquid discharge characteristics according to an embodiment of the present invention, the apparatus including: a liquid supply unit supplying a liquid; a liquid guide unit including a flow path through which the liquid supplied from the liquid supply unit passes and a nozzle mounting portion communicating with the flow path and on which the nozzle is mounted and guiding the liquid supplied from the liquid supply unit to the nozzle mounted on the nozzle mounting portion; a lighting unit projecting light onto the liquid passing through the flow path inside the liquid guide unit; and a camera obtaining an image of the liquid discharged from the nozzle by being arranged toward the nozzle.

24 Claims, 7 Drawing Sheets

APPARATUS FOR DETECTING LIQUID DISCHARGE CHARACTERISTICS AND APPARATUS FOR DISCHARGING LIQUID

CROSS REFERENCE TO RELATED APPLICATION

The present application claims priority to Korean Patent Application No. 10-2018-0077816, filed on Jul. 4, 2018, the entire contents of which is incorporated herein for all purposes by this reference.

BACKGROUND OF THE INVENTION

Field of the Invention

The present invention relates to an apparatus for detecting discharge characteristics of a liquid discharged from a nozzle.

Description of the Related Art

Generally, nozzles for discharging liquid are used in various industrial fields. Generally, liquid needs to be discharged from a nozzle with a fixed quantity meeting set conditions. Therefore, in order to determine whether or not the liquid is normally discharged from a nozzle, an apparatus for detecting liquid discharge characteristics of a liquid discharged from a nozzle is generally used.

A conventional apparatus for detecting the liquid discharge characteristics is composed of a light source arranged outside the nozzle and a camera arranged on an opposite side of the light source with the nozzle as a reference. Such an apparatus for detecting the liquid discharge characteristics obtains an image of a liquid discharged from the nozzle using the camera in a state where the nozzle and a periphery of the nozzle are illuminated using a light source. Subsequently, the obtained image of the liquid is analyzed, whereby liquid discharge characteristics are detected.

However, in the case of a conventional apparatus for detecting the liquid discharge characteristics, because the light source is arranged outside the nozzle to entirely illuminate the nozzle and a device or parts around the nozzle, the light projected from the light source scatters in the environment around the nozzle and undergoes diffraction or diffused reflection by the device or parts around the nozzle. Therefore, it is difficult to obtain a clear image due to scattering, diffraction, or diffused reflection of such light, and there is a problem in that the process, in order to obtain a clear image, of adjusting the position of the light source, the amount of light of the light projected from the light source, and the number of the light sources is complicated.

The foregoing is intended merely to aid in the understanding of the background of the present invention, and is not intended to mean that the present invention falls within the purview of the related art that is already known to those skilled in the art.

DOCUMENTS OF RELATED ART

Patent Document (Patent Document 1) Korean Patent Application Publication No. 10-2016-0127949

SUMMARY OF THE INVENTION

Accordingly, the present invention has been made keeping in mind the above problems occurring in the related art, and an objective of the present invention is to provide an apparatus for detecting liquid discharge characteristics capable of effectively detecting the discharge characteristics of a liquid discharged from a nozzle.

In order to achieve the above object, the apparatus for detecting liquid discharge characteristics according to an embodiment of the present invention, the apparatus including: a liquid supply unit supplying a liquid; a liquid guide unit including a flow path through which the liquid supplied from the liquid supply unit passes and a nozzle mounting portion communicating with the flow path and on which a nozzle is mounted and guiding the liquid supplied from the liquid supply unit to the nozzle mounted on the nozzle mounting portion; a lighting unit projecting light onto the liquid passing through the flow path of the liquid guide unit; and a camera obtaining an image of the liquid discharged from the nozzle by being arranged toward the nozzle.

The liquid guide unit may include: a main body having an internal space; and a tube providing the flow path by being arranged in an internal space of the main body and by being connected to the liquid supply unit and the nozzle mounting unit.

An inner surface of the main body constituting the internal space may be composed of a light reflecting surface.

The light reflecting surface may be provided by a light reflecting member or a light reflecting coating.

The lighting unit may include a plurality of light sources arranged along a circumference of the flow path.

The lighting unit may include a plurality of light sources arranged along a length of the flow path.

The lighting unit may include: a plurality of lighting members arranged at predetermined intervals along a circumference of the flow path; a plurality of light sources arranged in at least one row in each of the plurality of the lighting members; and a plurality of connecting members detachably connected to the plurality of the lighting members, and electrically connecting the plurality of the lighting members together.

The plurality of the connecting members may be configured so that a plurality of angles between the lighting members is adjustable.

The lighting unit may further include a protective film protecting the plurality of light sources by being configured to cover the plurality of the light sources.

At least some of the plurality of the light sources may emit light having wavelengths different from each other.

The plurality of the light sources may be arranged by being divided into a plurality of groups, and the light sources in any one of the plurality of groups emit light having a wavelength different from wavelengths of the light emitted from the light sources in other groups.

The liquid guide unit may be provided with a camera mounting portion on which the camera is mounted.

The apparatus may further include a temperature control unit controlling a temperature of the liquid supplied from the liquid supply unit.

The apparatus may further include a pressure control unit controlling a pressure of the liquid supplied from the liquid supply unit.

The present invention also provides an apparatus for discharging a liquid through a nozzle, the apparatus including: a liquid guide unit having a flow path therein through which a liquid passes; and a lighting unit projecting light onto the liquid passing through the flow path, in which the liquid is discharged through the nozzle in a state of being illuminated by the lighting unit.

The lighting unit may be arranged inside or outside the liquid guide unit.

According the apparatus for detecting liquid discharge characteristics according to the embodiment of the present invention, the liquid flowing along the flow path in the liquid guide unit can be discharged from the discharge port of the nozzle in a state of being illuminated by the lighting unit inside the liquid guide unit. Accordingly, without having scattering of the light outside the nozzle and undergoing diffraction and diffused reflection of the light by the device or parts around the nozzle, a clear image of the liquid can be obtained, and the discharge characteristics of the liquid can be effectively detected on the basis of the obtained clear image of the liquid.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
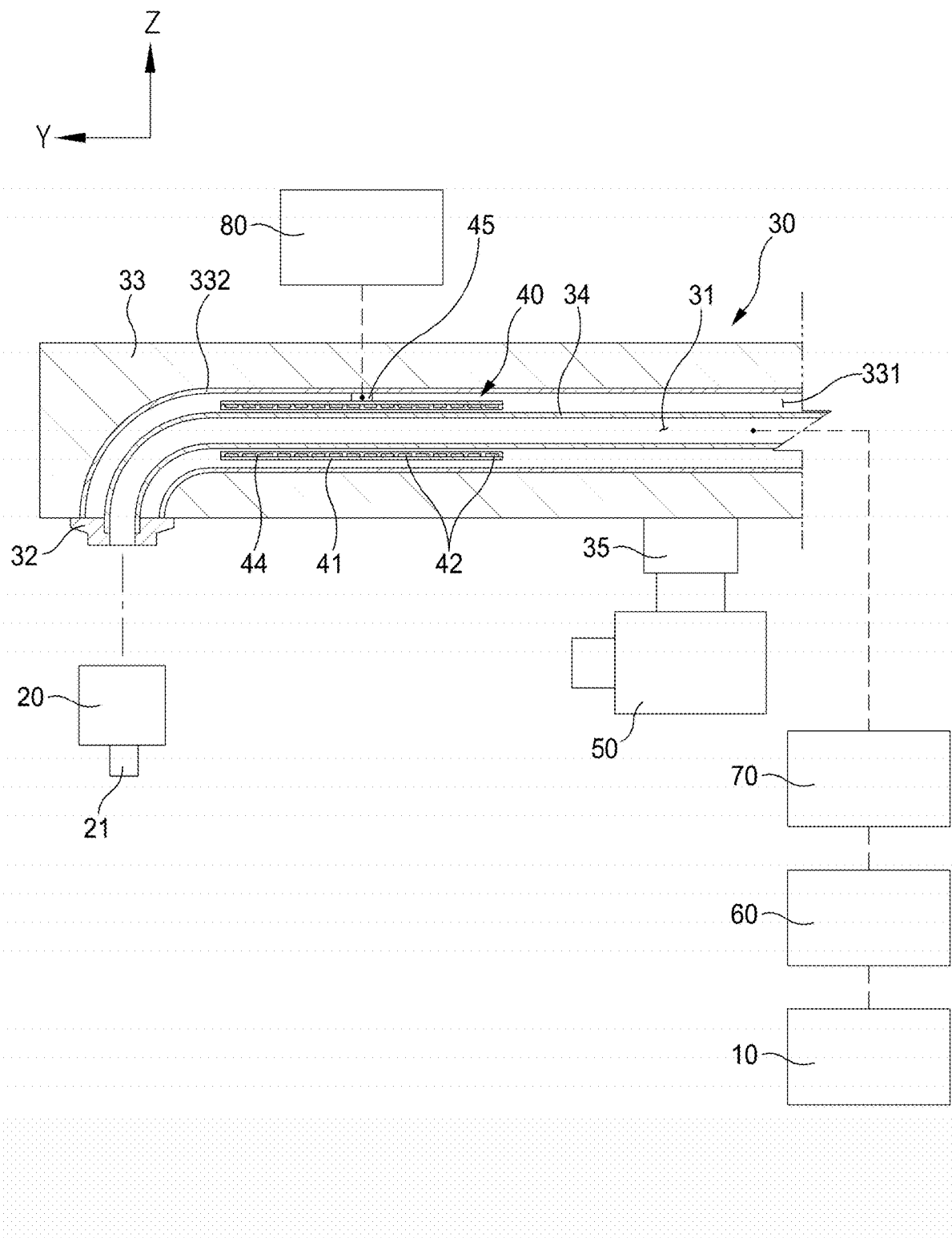
FIG. 1 is a cross-sectional view schematically showing an apparatus for detecting liquid discharge characteristics according to an embodiment of the present invention.

Hereinbelow, an apparatus for detecting liquid discharge characteristics according to an embodiment of the present invention will be described in detail with reference to the accompanying drawings. Throughout the drawings, the same reference numerals will refer to the same or like parts.

The apparatus for detecting liquid discharge characteristics according to the embodiment of the present invention may be utilized for detecting the discharge characteristics of a liquid discharged from various kinds of nozzles. For example, the apparatus for detecting the liquid discharge characteristics according to the embodiment of the present invention may be used for detecting the discharge characteristics of the liquid discharged from various industrial nozzles used for discharging liquid such as a nozzle used for discharging ink from a printing device, a nozzle used for applying a liquid such as a photoresist on a wafer or a substrate in a semiconductor manufacturing process such as a photolithography process, a nozzle for discharging cleaning liquid for cleaning various industrial equipment and/or parts, and a nozzle used for applying a liquid crystal or a paste on a panel in a display manufacturing process, and the like.

In addition, the apparatus for detecting the liquid discharge characteristics according to the embodiment of the present invention may be used for detecting the discharge characteristics of the liquid discharged from the nozzles that discharge the liquid in various forms. For example, the apparatus for detecting the liquid discharge characteristics may be used for detecting the discharge characteristics of the liquid discharged from the nozzle in a state of a liquid column, atomization, or a droplet.

For example, the discharge characteristics of the liquid may be a shape, an angle, a width, a length, a size, a scale, a diameter of a droplet, a shape of a droplet, a number of droplets, an atomization shape, and an atomization width of the liquid.

As shown in FIG. 1, the apparatus for detecting liquid discharge characteristics according to the embodiment of the present invention includes: a liquid supply unit 10 supplying a liquid, a liquid guide unit 30 having a flow path 31 through which the liquid supplied from the liquid supply unit 10 passes and a nozzle mounting portion 32 on which the nozzle 20 is mounted; a lighting unit 40 arranged inside the liquid guide unit 30 and projecting light onto the liquid passing through the flow path 31, and a camera 50 obtaining an image of the liquid discharged from the nozzle 20 by being arranged toward the nozzle 20 mounted on the nozzle mounting portion 32.

The liquid supply unit 10 may be composed of a pump and the like. The apparatus for detecting the liquid discharge characteristics according to the embodiment of the present invention may detect the discharge characteristics of the liquid discharged from the nozzle 20 while changing the conditions such as the temperature (viscosity), the pressure, and the like of the liquid supplied from the liquid supply unit 10. To this end, the apparatus for detecting the liquid discharge characteristics may include a pressure control unit 60 controlling the pressure of the liquid supplied from the liquid supply unit 10 and a temperature control unit 70 controlling the temperature of the liquid supplied from the liquid supply unit 10. Meanwhile, the pressure control unit 60 may be composed of a liquid regulator and the like, and the temperature control unit 70 may include a heater heating the liquid and a cooler cooling the liquid. Like this, because the apparatus for detecting the liquid discharge characteristics includes the pressure control unit 60 and the temperature control unit 70 that control the pressure and temperature of the liquid supplied from the liquid supply unit 10, respectively, it is possible to detect the discharge characteristics of the liquid discharged from the nozzle 20 while variously changing the conditions of the liquid.

The liquid guide unit 30 serves to guide the liquid supplied from the liquid supply unit 10 to the nozzle 20 mounted on the nozzle mounting portion 32. The liquid guide unit 30 may include a main body 33 having an internal space 331 and a tube providing a flow path 31 by being arranged in the internal space 331 of the main body 33 and connected to the liquid supply unit 10 and the nozzle mounting portion 32.

The nozzle mounting portion 32 may be installed on the outer surface of the main body 33 and may communicate with the flow path 31. When the flow path 31 is formed by the tube 34, the nozzle mounting portion 32 may communicate with the tube 34.

Various types of nozzles 20 may be connected to the nozzle mounting portion 32. The nozzle mounting portion 32 may be configured such that the nozzle is coupled to the nozzle mounting portion 32 by a screw coupling method, a snap coupling method, a Luer-Lock method, or a coupling method via a fastening member such as a screw bolt.

Accordingly, because various types of nozzles 20 may be connected to the nozzle mounting portion 32, the discharge characteristics of the liquid discharged from the various kinds of nozzles 20 may be detected. Here, the various kinds of nozzles 20 may include a nozzle having one or a plurality of discharge ports 21 and a nozzle having a discharge port 21 formed in a slit shape.

The main body 33 may be provided with a camera mounting portion 35 on which the camera 50 is mounted. The camera mounting portion 35 may be configured such that the camera 50 is coupled to the camera mounting portion 35 by a coupling method such as a screw coupling method, a snap coupling method, a Luer-Lock method, or a coupling method via a fastening member such as a screw bolt. Because the camera 50 may be mounted on the camera mounting portion 35 provided on the main body 33 as described above, the camera 50 may be integrally connected to the main body 33. Accordingly, it is possible to easily construct the apparatus for detecting the liquid discharge characteristics without providing a separate device to fix the apparatus for detecting the liquid discharge characteristics. Meanwhile, the camera mounting portion 35 may be configured to adjust the position of the camera 50 with respect to the main body 33.

The tube 34 constituting the flow path 31 may be composed of a transparent or translucent material so that the light projected from the lighting unit 40 may reach the liquid passing through the flow path 31. For example, the tube 34 may be composed of a synthetic resin such as PVC.

In addition, the main body 33 may be composed of a material capable of blocking the light so as to prevent the light projected onto the liquid passing through the flow path 31 from leaking to the outside. In addition, an inner surface of the main body 33 constituting the internal space 331 may be composed of a light reflecting surface 332 so that the light projected onto the liquid passing through the flow path 31 is prevented from leaking to the outside and is concentrated on the liquid. When the main body 33 is composed of metal, the light reflecting surface 332 may be provided by a process of polishing the inner surface of the main body 33. As another example, the light reflecting surface 332 may be provided by attaching a light reflecting member composed of a light reflecting material to the inner surface of the main body 33 or by coating the inner surface of the main body 33 with a light reflecting material. By this light reflecting surface 332, the light projected onto the liquid may be prevented from leaking to the outside and may be concentrated on the liquid.

Figure 2:
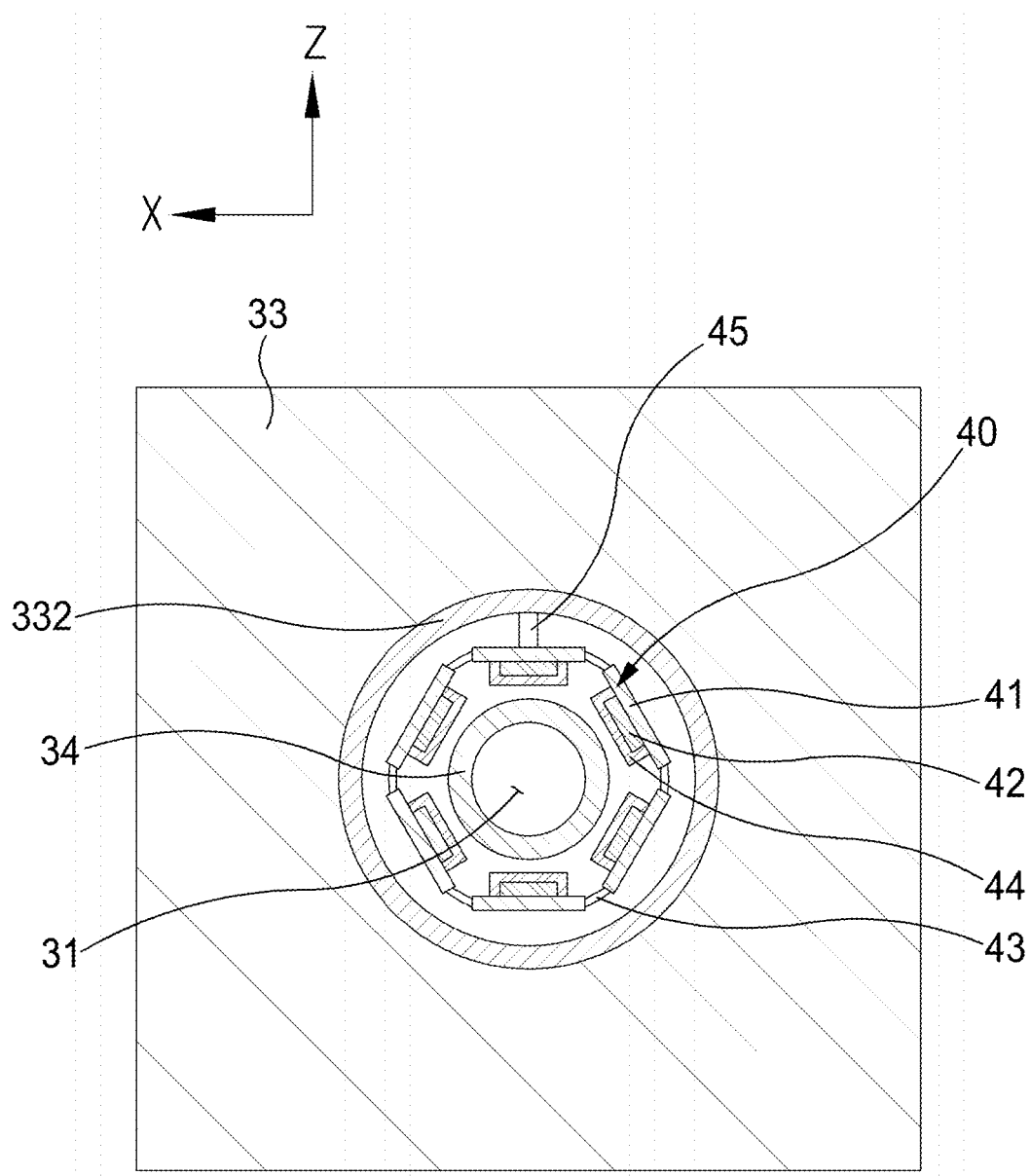
FIG. 2 is a cross-sectional view schematically showing a liquid guide unit and a lighting unit of the apparatus for detecting liquid discharge characteristics according to the embodiment of the present invention.
Figure 3:
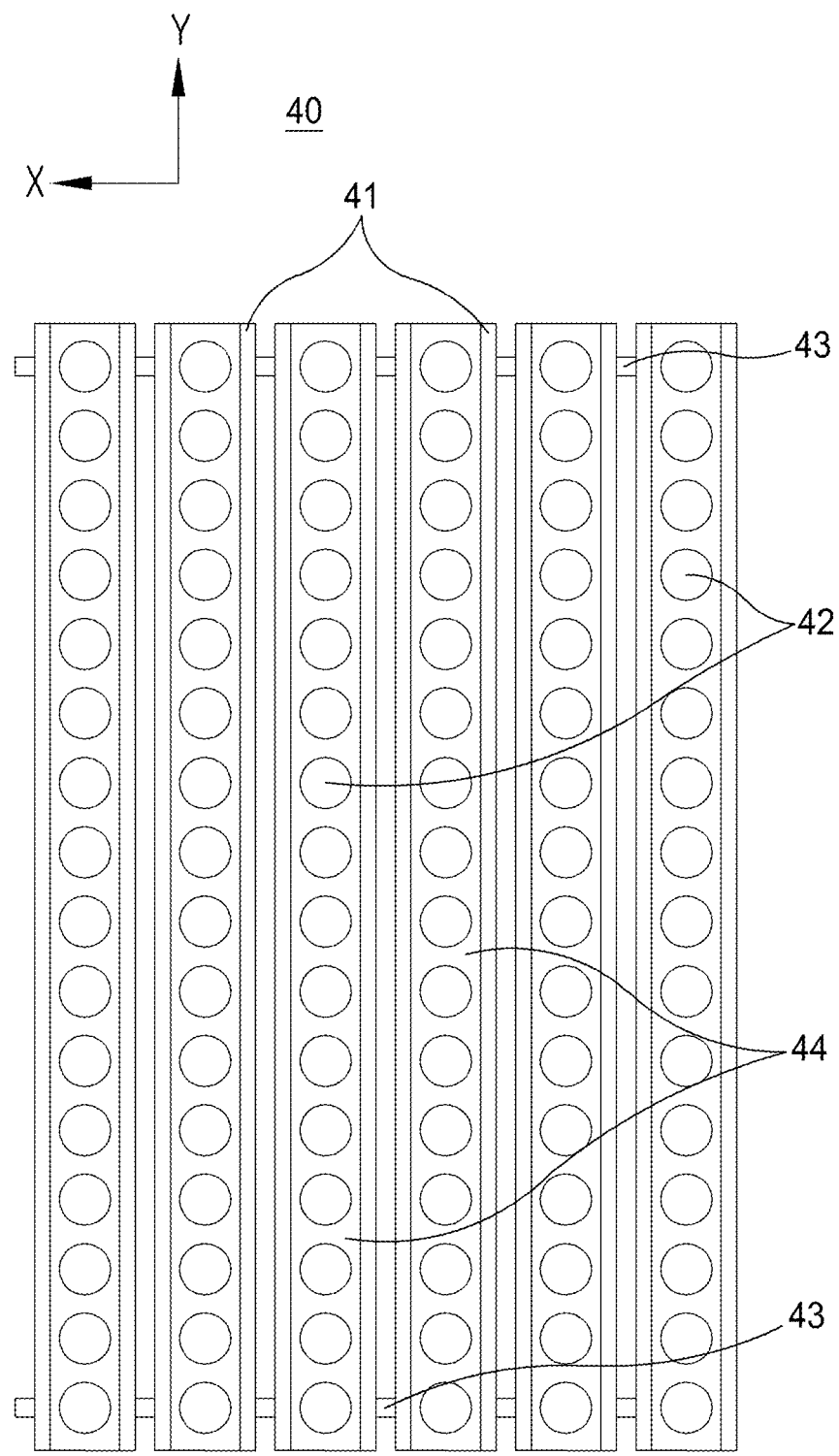
FIG. 3 is a view schematically showing the lighting unit of the apparatus for detecting liquid discharge characteristics according to an embodiment of the present invention.

As shown in FIGS. 1 to 3, the lighting unit 40 may include a plurality of lighting members 41 arranged at predetermined intervals along circumference of the flow path 31, a plurality of light sources arranged in at least one row in each of the plurality of the lighting members 41, and a plurality of connecting members 43 detachably connected to each of the plurality of the lighting members 41 and electrically connecting the plurality of the lighting members 41.

As the plurality of lighting members 41 is arranged at predetermined intervals along the circumference of the flow path 31, the plurality of the light sources 42 may be arranged along the circumference of the flow path 31. In addition, as the plurality of the light sources 42 is arranged in at least one row in each of the plurality of the lighting members 41, the plurality of light sources 42 may be arranged along a length of the flow path 31. Thus, because the plurality of the light sources 42 may be arranged along the circumference and/or the length of the flow path 31, the light may be uniformly transmitted to the liquid passing through the flow path 31.

Depending on the characteristics of the nozzles 20 and/or the characteristics of the liquid, the plurality of the light sources 42 may be simultaneously turned on/off or some of the plurality of the light sources 42 may be selectively turned on/off. For example, depending on the characteristics of the nozzles 20 such as the size of the discharge port 21 of the nozzle 20, the number of the discharge ports 21 of the nozzle 20, the number of the nozzles 20, and the like, and/or the characteristics of the liquid such as temperature of the liquid, pressure of the liquid, viscosity of the liquid, and the like, the plurality of the light sources 42 may be simultaneously turned on/off or some of the plurality of the light sources 42 may be selectively turned on/off so that an amount of light of the light emitted from the plurality of the light sources 42 may be appropriately adjusted. As some of the plurality of the light sources 42 are selectively operated, the width and/or the length of the flow path 31 where the light is projected may become different.

In addition, at least some of the plurality of the light sources 42 may be configured to emit light having wavelengths different from each other. For example, the plurality of the light sources 42 may be configured to respectively emit light having various wavelengths including infrared light, ultraviolet light, red light, green light, and blue light. For example, the plurality of the light sources 42 is arranged by being divided into a plurality of groups, and the light sources 42 in one of the plurality of groups may be configured to emit light having a wavelength different from wavelengths of the light emitted from the light sources 42 in other groups. In such a case, a plurality of the light sources 42 in one group may be arranged in at least one row along the circumference of the flow path 31, and the plurality of groups may be sequentially arranged along the length of the flow path 31. Accordingly, the plurality of the light sources 42 that emit light having different wavelengths may be arranged along the length of the flow path 31. As another example, the plurality of the light sources 42 in one group may be arranged in at least one row along the length of the flow path 31, and the plurality of groups may be sequentially arranged along the circumference of the flow path 31. Accordingly, the plurality of the light sources 42 that emit light having different wavelengths may be arranged along the circumference of the flow path 31. As described above, because the plurality of the light sources 42 may be configured to emit light having various wavelengths, depending on the characteristics of the liquid such as the temperature of the liquid, the pressure of the liquid, the viscosity of the liquid, and the like, light having any one of various wavelengths may be projected onto the liquid, or light combined with a plurality of light having different wavelengths may be projected onto the liquid. Accordingly, a clear image of the liquid that is discharged from the nozzle 20 according to the characteristics of the liquid may be obtained, and the discharge characteristics of the liquid may be effectively detected on the basis of the clear image of the liquid.

The connecting member 43 may be detachably connected to the lighting member 41. For example, the connecting member 43 may be detachably connected to the lighting member 41 by an interference fitting or a fastening member such as a screw or nut. Therefore, the plurality of the lighting members 41 in the required number may be connected to each other by the plurality of the connecting members 43.

Figure 4:
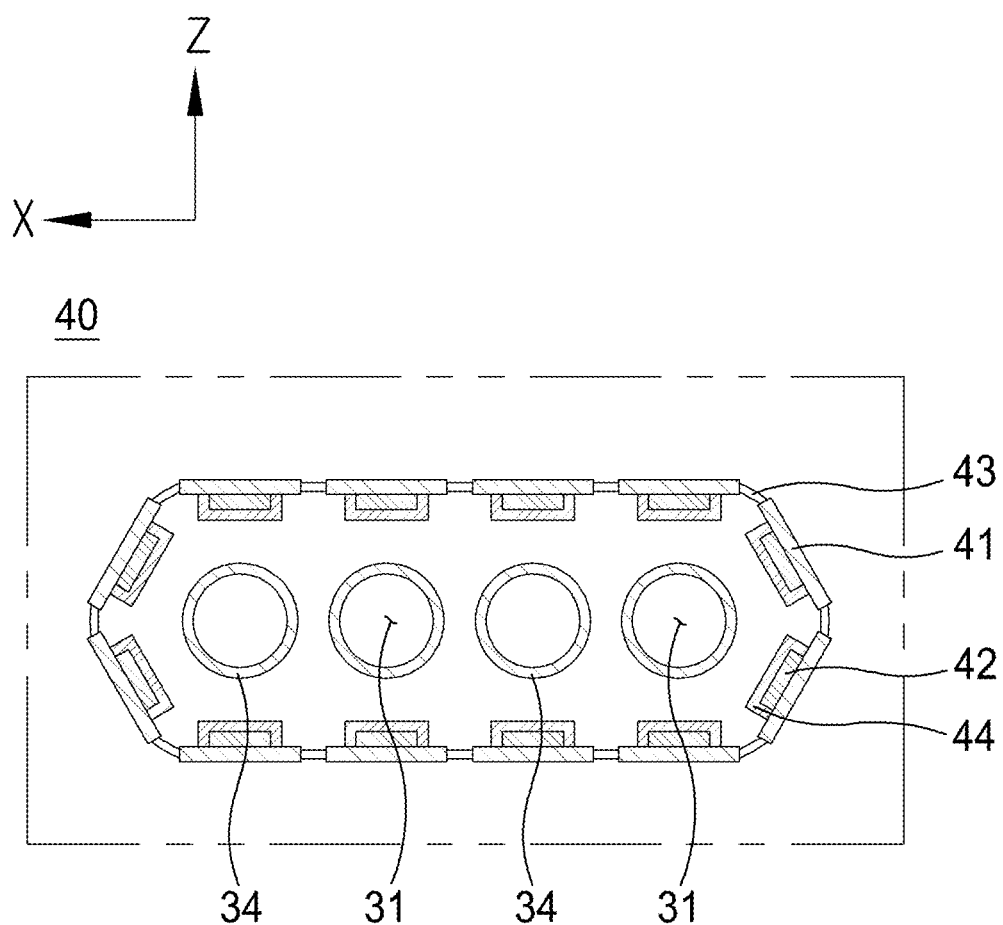
FIG. 4 is a cross-sectional view schematically showing another example of the lighting unit of the apparatus for detecting liquid discharge characteristics according to the embodiment of the present invention.

The plurality of the connecting members 43 may be configured so that a plurality of the angles between the lighting members 41 is adjustable. For example, each connecting member 43 may be configured to include a hinge shaft so that the plurality of lighting members 41 may be rotated with respect to each other with the hinge shaft as a center. As another example, each connecting member 43 may be composed of a conductive material that is bendable but may maintain a bent shape. As described above, because the angle between the plurality of lighting members 41 may be adjusted, the plurality of lighting members 41 may be appropriately arranged according to the size and number of the flow paths 31. For example, as shown in FIG. 4, when a plurality of tubes 34 is arranged in one main body 33 to constitute a plurality of flow paths 31, as a plurality of lighting members 41 are arranged in an appropriate number, and each angle between the plurality of lighting members 41 is appropriately adjusted, a plurality of lighting members 41 may be arranged on a circumference of the plurality of flow paths 31. Therefore, the plurality of lighting members 41 may be appropriately arranged according to the size and the number of the flow paths 31, whereby light may be uniformly transmitted to the liquid passing through the plurality of flow paths 31. As a result, a clear image of the liquid discharged from the nozzle 20 may be obtained, and the discharge characteristics of the liquid may be effectively detected on the basis of the clear image of the liquid.

The lighting unit 40 may further include a protective film 44 protecting the plurality of the light sources 42 by being configured to cover the plurality of the light sources 42. Accordingly, the plurality of the light sources 42 may be protected from external impact or contamination when the plurality of lighting members 41 is in the process of being transported or in the process of being arranged inside the main body 33. The protective film 44 may be composed of a synthetic resin such as silicone having shock absorption force and antifouling. For example, the protective film 44 may be formed by applying a synthetic resin and the like onto the plurality of the light sources 42 in a state where the plurality of the light sources 42 are arranged on the lighting member 41.

Meanwhile, as shown in FIGS. 1 and 2, at least one of the plurality of the lighting members 41 may be fixed to the fixing member 45 fixed to the inside of the main body 33. Therefore, the plurality of the lighting members 41 may be fixed to the inside of the main body 33 in a state where the shape thereof is maintained by the plurality of the connecting members 43. For example, the fixing member 45 may include a conductive member and may be connected to a power source 80. Accordingly, a current may be applied from the power source 80 to the lighting member 41 fixed to the fixing member 45, and the current applied to the lighting member 41 fixed to the fixing member 45 may be applied to the plurality of lighting members 41 through the plurality of connecting members 43.

Figure 5:
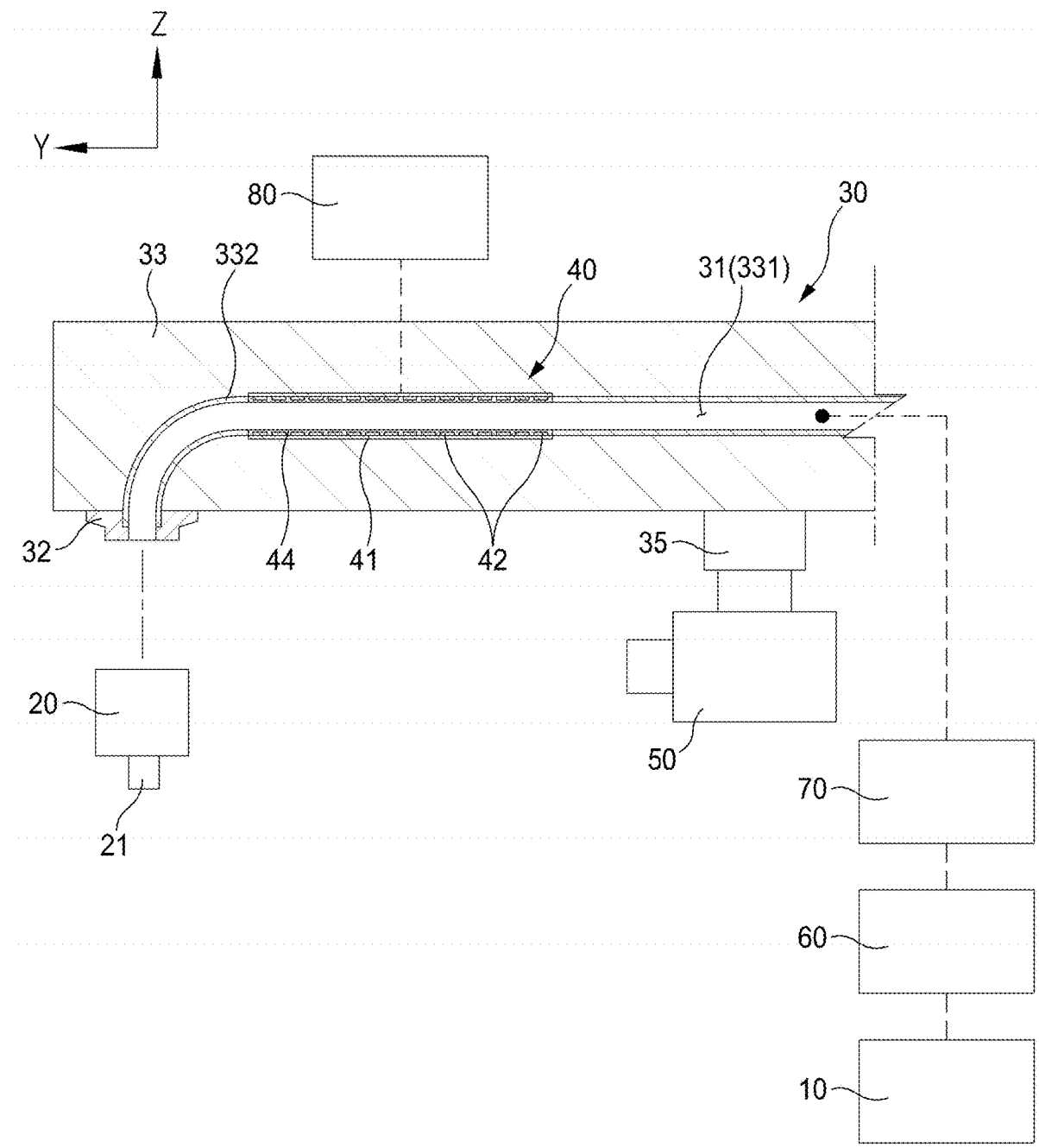
FIG. 5 is a schematic view showing another example of the apparatus for detecting liquid discharge characteristics according to the embodiment of the present invention.

FIG. 5 is a view showing another example of the apparatus for detecting liquid discharge characteristics according to the embodiment of the present invention. As shown in FIG. 5, an internal space 331 of a main body 33 is provided with no separate tube, and the internal space 331 of the main body 33 may constitute a flow path 31. In this case, a lighting unit 40 may be fixed to an inner surface of the main body 33 forming the internal space 331.

Figure 6:
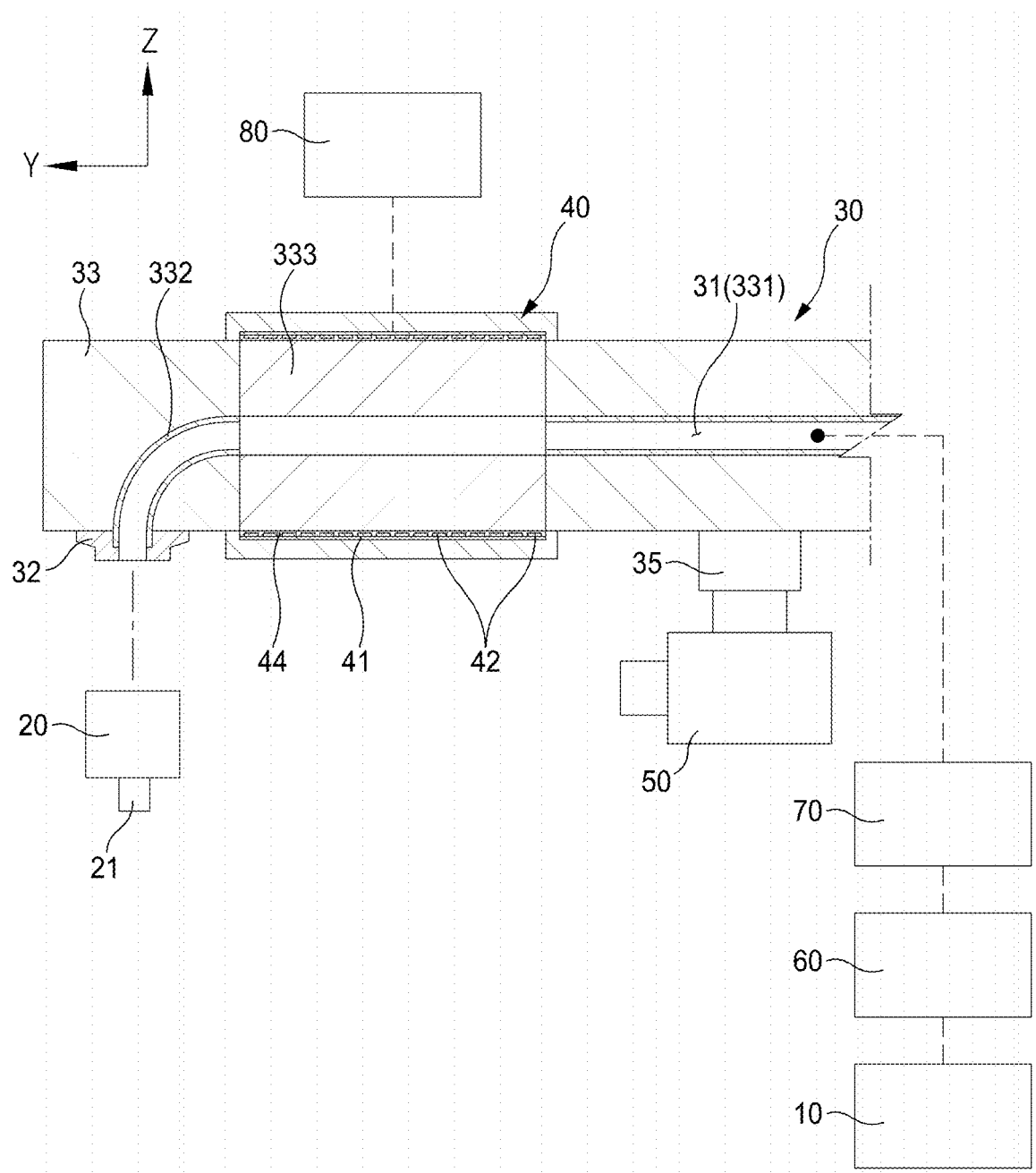
FIG. 6 is a schematic view showing still another example of the apparatus for detecting liquid discharge characteristics according to the embodiment of the present invention.

FIG. 6 is a view showing still another example of the apparatus for detecting liquid discharge characteristics according to the embodiment of the present invention. As shown in FIG. 6, a lighting unit 40 may be arranged outside a main body 33 without being arranged inside the main body 33. In addition, a portion of the main body 33 in which the lighting unit 40 is arranged may be composed of a light transmitting portion 333 composed a material through which light emitted from the lighting unit 40 may be transmitted. According to this configuration, the light emitted from the lighting unit 40 arranged outside the main body 33 may be transmitted to the liquid in a flow path 31 through the light transmitting portion 333.

Figure 7:
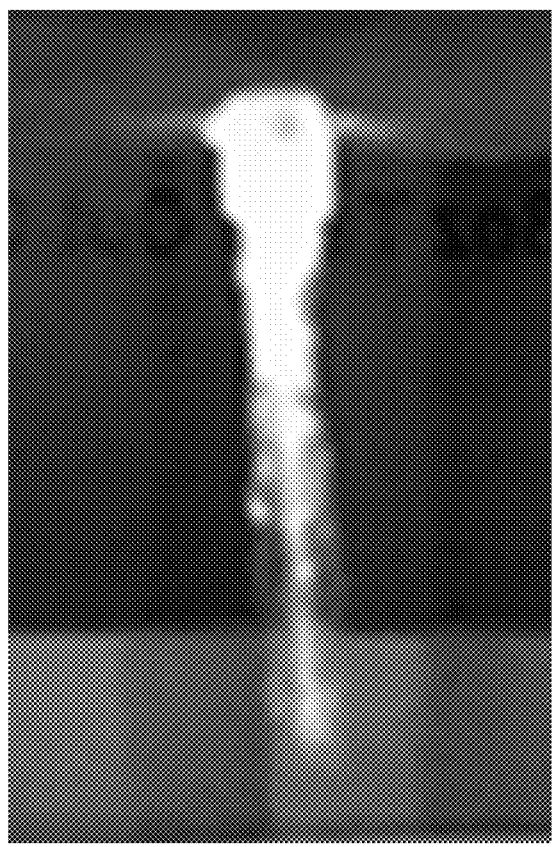
FIG. 7 is an image showing discharge characteristics of a liquid discharged from the apparatus for detecting liquid discharge characteristics according to the embodiment of the present invention.

According the apparatus for detecting the liquid discharge characteristics according to the embodiment of the present invention, the liquid flowing along the flow path 31 in the liquid guide unit 30 may be discharged from the discharge port 21 of the nozzle 20 in a state of being illuminated by the lighting unit 40 inside the liquid guide unit 30. Accordingly, as shown in FIG. 7, without having scattering of the light outside the nozzle 20 and undergoing diffraction and diffused reflection of the light by a device or parts around the nozzle 20, a clear image of the liquid may be obtained, and the discharge characteristics of the liquid may be effectively detected on the basis of the obtained clear image of the liquid. In addition, the characteristics of the liquid and the characteristics of the nozzle may be inspected or evaluated on the basis of the detected liquid discharge characteristics.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An apparatus for detecting liquid discharge characteristics, the apparatus comprising:
   a liquid supply unit supplying a liquid;
   a liquid guide unit including a flow path through which the liquid supplied from the liquid supply unit passes and a nozzle mounting portion communicating with the flow path and on which a nozzle is mounted and guiding the liquid supplied from the liquid supply unit to the nozzle mounted on the nozzle mounting portion;
   a lighting unit projecting light onto the liquid passing through the flow path of the liquid guide unit; and
   a camera obtaining an image of the liquid discharged from the nozzle by being arranged toward the nozzle.

2. The apparatus of claim 1, wherein the liquid guide unit includes:
   a main body having an internal space; and
   a tube providing the flow path by being arranged in an internal space of the main body and by being connected to the liquid supply unit and the nozzle mounting portion.

3. The apparatus of claim 2, wherein an inner surface of the main body constituting the internal space is composed of a light reflecting surface.

4. The apparatus of claim 3, wherein the light reflecting surface is provided by a light reflecting member or a light reflecting coating.

5. The apparatus of claim 1, wherein the lighting unit includes a plurality of light sources arranged along a circumference of the flow path.

6. The apparatus of claim 5, wherein at least some of the plurality of the light sources emit light having wavelengths different from each other.

7. The apparatus of claim 6, wherein the plurality of the light sources is arranged by being divided into a plurality of groups, and the light sources in any one of the plurality of groups emit light having a wavelength different from wavelengths of the light emitted from the light sources in other groups.

8. The apparatus of claim 1, wherein the lighting unit includes a plurality of light sources arranged along a length of the flow path.

9. The apparatus of claim 8, wherein at least some of the plurality of the light sources emit light having wavelengths different from each other.

10. The apparatus of claim 9, wherein the plurality of the light sources is arranged by being divided into a plurality of groups, and the light sources in any one of the plurality of groups emit light having a wavelength different from wavelengths of the light emitted from the light sources in other groups.

11. The apparatus of claim 1, wherein the lighting unit includes:
 a plurality of lighting members arranged at predetermined intervals along a circumference of the flow path;
 a plurality of light sources arranged in at least one row in each of the plurality of the lighting members; and
 a plurality of connecting members detachably connected to the plurality of the lighting members, and electrically connecting the plurality of the lighting members together.

12. The apparatus of claim 11, wherein the plurality of the connecting members is configured so that a plurality of angles between the lighting members is adjustable.

13. The apparatus of claim 12, wherein at least some of the plurality of the light sources emit light having wavelengths different from each other.

14. The apparatus of claim 13, wherein the plurality of the light sources is arranged by being divided into a plurality of groups, and the light sources in any one of the plurality of groups emit light having a wavelength different from wavelengths of the light emitted from the light sources in other groups.

15. The apparatus of claim 11, wherein the lighting unit further includes a protective film protecting the plurality of light sources by being configured to cover the plurality of the light sources.

16. The apparatus of claim 15, wherein at least some of the plurality of the light sources emit light having wavelengths different from each other.

17. The apparatus of claim 16, wherein the plurality of the light sources is arranged by being divided into a plurality of groups, and the light sources in any one of the plurality of groups emit light having a wavelength different from wavelengths of the light emitted from the light sources in other groups.

18. The apparatus of claim 11, wherein at least some of the plurality of the light sources emit light having wavelengths different from each other.

19. The apparatus of claim 18, wherein the plurality of the light sources is arranged by being divided into a plurality of groups, and the light sources in any one of the plurality of groups emit light having a wavelength different from wavelengths of the light emitted from the light sources in other groups.

20. The apparatus of claim 1, wherein the liquid guide unit is provided with a camera mounting portion on which the camera is mounted.

21. The apparatus of claim 1, further including a temperature control unit controlling a temperature of the liquid supplied from the liquid supply unit.

22. The apparatus of claim 1, further including a pressure control unit controlling a pressure of the liquid supplied from the liquid supply unit.

23. An apparatus for discharging a liquid through a nozzle, the apparatus comprising:
 a liquid guide unit having a flow path therein through which a liquid passes; and
 a lighting unit projecting light onto the liquid passing through the flow path,
 wherein the liquid is discharged through the nozzle in a state of being illuminated by the lighting unit.

24. The apparatus of claim 23, wherein the lighting unit is arranged inside or outside the liquid guide unit.

* * * * *